C. C. FARMER.
SAFETY CAR CONTROL DEVICE.
APPLICATION FILED MAY 5, 1919.
1,378,404.
Patented May 17, 1921.
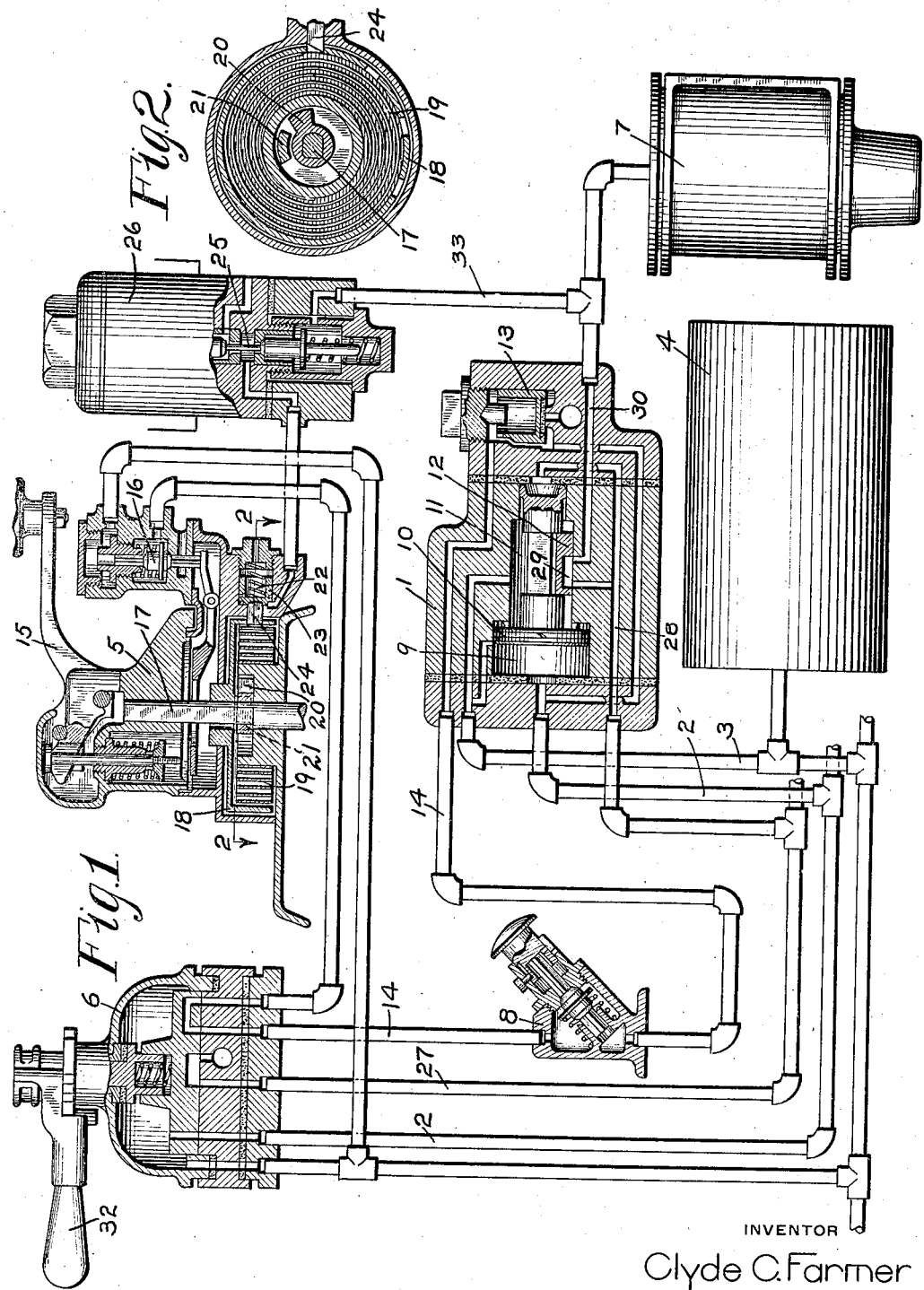
INVENTOR
Clyde C. Farmer
by Wm. M. Cady
At'y.

UNITED STATES PATENT OFFICE.

CLYDE C. FARMER, OF PITTSBURGH, PENNSYLVANIA, ASSIGNOR TO WESTINGHOUSE AIR BRAKE COMPANY, OF WILMERDING, PENNSYLVANIA, A CORPORATION OF PENNSYLVANIA.

SAFETY CAR-CONTROL DEVICE.

1,378,404.  Specification of Letters Patent.  Patented May 17, 1921.

Application filed May 5, 1919. Serial No. 294,878.

*To all whom it may concern:*

Be it known that I, CLYDE C. FARMER, a citizen of the United States, residing at Pittsburgh, in the county of Allegheny and State of Pennsylvania, have invented new and useful Improvements in Safety Car-Control Devices, of which the following is a specification.

This invention relates to a safety car control equipment, adapted more particularly for electric traction service.

It has heretofore been proposed to provide an equipment of the above character, in which the brakes are applied when the operator removes his hand from the controller handle, and a switch is also operated for opening the electric power circuit.

Means have also been provided whereby, if a straight air application of the brakes be effected, the removal of the operator's hand from the controller handle will not be effective to cause an emergency application of the brakes and the opening of the power circuit.

It has been found, however, that in some cases, where the trolley has come off the wire, the operator will make a straight air application of the brakes to stop the car and then leave the car to replace the trolley with the controller handle in an "on" position. The result is that when the trolley is replaced, current will at once be supplied to the car motors and the car is liable to run away before the operator can get back on the car.

The principal object of my invention is to obviate the above difficulty by providing means operated in a power position of the controller, if the brakes have been applied, for insuring the automatic return of the controller handle to "off" position.

In the accompanying drawing; Figure 1 is a diagrammatic view, mainly in section, of a safety car control equipment embodying my improvement, and Fig. 2 a section on the line 2—2 of Fig. 1.

As shown in Fig. 1 of the drawing, the safety car control equipment may comprise an emergency valve device 1, connected to brake pipe 2 and by pipe 3 to main reservoir 4, a controller handle device 5 of the type adapted upon release of the controller handle to effect an emergency application of the brakes, a motorman's brake valve 6, a brake cylinder 7, and a foot valve device 8 adapted for preventing the brakes from being applied in emergency upon removing the hand from the controller handle.

The emergency valve device 1 may comprise a casing having a piston chamber 9 connected to brake pipe 2 and containing piston 10 and a valve chamber 11, connected to main reservoir 4, and containing slide valve adapted to be operated by piston 10. The casing also contains a relay valve 13, having one side connected to a pipe 14, leading to brake valve 6.

The controller handle device 5 may comprise a handle 15 adapted when released by the operator to shift a double beat valve 16.

The controller shaft 17 passes through a casing 18, within which is mounted a spiral spring 19, adapted to be wound up by the rotation of the casing.

The shaft 17 carries a lug 20 adapted to engage with a lug 21 on the casing 18 when the casing is rotated. The casing is provided with an aperture, preferably corresponding with each power position of the controller, into which a locking pin 24 is adapted to be thrust by the action of a coil spring 22 acting on piston 23. The locking pin 24 is released by supplying fluid under pressure supplied to the brake cylinder in applying the brakes to one side of the piston 23 and for this purpose, the piston 23 is connected to the brake cylinder 7 by the operation of a double beat valve 25 adapted to be controlled by a magnet 26, the coil of which is in circuit with the car motor.

The pin 24 has a beveled end, so that in turning the controller handle, while the pin will slip into the corresponding aperture for each power position of the controller, the pin will be forced out again as the controller is moved beyond one power position to the next power position.

In operation, when the controller handle is turned to start the car the spring 19 is wound up and is locked under tension by the engagement of the pin 24 with one of the apertures in the member 18, according to the power position the handle happens to be moved to.

In all subsequent movements of the controller handle, the spring 19 being locked, the free movement of the handle is permitted, except as the handle is being turned to a further power position, in which case the pin 24 again engages with the corresponding aperture in the member 18 to lock the spring.

If current fails for any reason, as by the trolley leaving the trolley wire, the operator will make an application of the brakes to bring the car to a stop by turning the brake valve handle 32 to the straight air application position, in which fluid is supplied through the straight air pipe 27, passage 28, cavity 29 in slide valve 12 and passage 30 to the brake cylinder 7.

Since current is not being supplied to the car motors, the magnet 26 will be deënergized, so that communication is closed from brake cylinder pipe 33 to the piston 23.

If the current again starts to flow, by the operator replacing the trolley on the trolley wire and if the controller handle has been accidentally left in a power position, current will then be supplied to the magnet 26, and then the energization of magnet 26 operates the double beat valve 25 so as to open communication for supplying fluid from the brake cylinder to the piston 23 which is then moved to withdraw the locking pin 24 from engagement with the member 18.

The spring 19 is therefore released and operates to return the controller handle 15 to "off" position.

By this means, if the controller handle should happen to be left in a power position with the operator away from his post, the controller handle being thrown to "off" position, when current again flows, the car is prevented from starting.

When the operator removes his hand from the controller handle 15, the double beat valve 16 is operated to vent fluid from the relay valve 13, so that fluid is vented by the opening of said valve from the piston chamber 9 of the emergency valve device.

The slide valve 12 is then actuated to open communication from valve chamber 11 and the main reservoir to the brake cylinder 7.

While not shown in the drawing, it has heretofore been proposed to provide an automatic device adapted to be operated when the controller handle is released for opening the power circuit, so that in such case, the operation of my improvement is not necessary.

Having now described my invention, what I claim as new, and desire to secure by Letters Patent, is:—

1. In a safety car control apparatus, the combination with a controller and means for applying the brakes by fluid under pressure, of means operated by fluid under pressure in applying the brakes, for effecting the movement of the controller to off position.

2. In a safety car control apparatus, the combination with a controller and means for applying the brakes, of means operated by the current in a power position of the controller in case the brakes have been applied for effecting the movement of the controller to off position.

3. In a safety car control apparatus, the combination with a controller and means for effecting an application of the brakes, of a spring tending to move the controller to off position upon being retracted, a lock for holding the spring retracted, and means operating with the brakes applied for releasing said lock.

4. In a safety car control apparatus, the combination with a controller and means for effecting an application of the brakes, of a spring tending to move the controller to off position upon being retracted, a lock for holding the spring retracted, and means operating with the brakes applied by current in a power position of the controller for releasing said lock.

5. In a safety car control apparatus, the combination with a power controller and a brake cylinder for applying the brakes, of a spring tending to move the controller to off position, a lock for holding the spring under tension, a piston operated by brake cylinder pressure for releasing said lock, and a valve operated by the current in a power position of the controller for supplying fluid from the brake cylinder to said piston.

6. In a safety car control apparatus, the combination with a power controller and a brake cylinder for applying the brakes, of a spring tending to move the controller to off position, a lock for holding the spring under tension, a piston operated by brake cylinder pressure for releasing said lock, a valve for controlling the supply of fluid from the brake cylinder to said piston, and a magnet adapted to be energized by current supplied to the car motor for opening said valve.

7. In a safety car control apparatus, the combination with a power controller and a brake cylinder, of a spring for opposing movement of the controller from off position, a lock for holding the spring retracted in a power position of the controller, and means operated when current is supplied to the car motor for supplying fluid from the brake cylinder to said lock for releasing same.

In testimony whereof I have hereunto set my hand.

CLYDE C. FARMER.